United States Patent [19]
Henderson et al.

[11] Patent Number: 5,671,271
[45] Date of Patent: Sep. 23, 1997

[54] DIALER PROGRAMMING SYSTEM AND DEVICE WITH INTEGRATED PRINTING PROCESS

[76] Inventors: Daniel A. Henderson, 623 40th Ave., San Francisco, Calif. 94121; Darren Townsley, 20 Cedar Pointe Loop, #211, San Ramon, Calif. 94583

[21] Appl. No.: 450,518

[22] Filed: May 25, 1995

[51] Int. Cl.$^6$ .................................................. H04M 1/00
[52] U.S. Cl. .......................... 379/355; 379/354; 379/357
[58] Field of Search ................................... 379/355, 354, 379/356, 357, 426, 444

[56] References Cited

U.S. PATENT DOCUMENTS

| | | | |
|---|---|---|---|
| 4,941,172 | 7/1990 | Winebaum et al. | 379/355 |
| 5,343,519 | 8/1994 | Feldman | 379/355 |

*Primary Examiner*—Krista M. Zele
*Assistant Examiner*—Jacques M. Saint-Surin
*Attorney, Agent, or Firm*—Melvin A. Hunn

[57] ABSTRACT

An improved dialer programming system and device in which an assembled dialer may be loaded into a combined programming and printing system to be programmed with predetermined signals and imprinted with associated variable data. The predetermined and programmed signals may be representative of telephone numbers, account authorization numbers, or other data. The associated variable information to be printed may be textual such as name, account number or telephone number data or graphical, such as graphic designs or barcode images. The variable information may be printed or affixed to the dialer using a wide variety of processes adapted to the needs of the end user. An improved assembly design for the dialer device and improved dialer programming and imprinting system are particularly adapted to accommodate high volume production of many dialer devices with different programming and imprinting requirements. Additional new programming techniques for autodialer devices are also described.

11 Claims, 12 Drawing Sheets

DIALER PROGRAMMING SYSTEM AND DEVICE WITH INTEGRATED PRINTING PROCESS

BACKGROUND OF THE INVENTION

1. Field of the Invention

This invention relates generally to automatic telephone dialer devices and dialer programming systems, and particularly to dialer devices preprogrammed with specific telephone numbers.

2. Description of the Prior Art

Preprogrammed autodialers are useful in applications for prepaid calling or credit cards for telephone services, advertising and premium incentives, and other uses. Typically dialer devices of this type are characterized by a lack of programmability by the end-user of account information in that they are programmed in advance by a releasable electrical connection or the dialing signal is preprogrammed on a hard-wired or mask level on the chip. Such devices are useful in that a common theft known as "shoulder surfing" is reduced or eliminated. In shoulder surfing, unscrupulous parties may write down a calling parties calling card number that is annunciated to an operator or dialed on a DTMF keypad. The stolen account number may later be used for telephone calls not authorized by the party who is ultimately billed for such calls. A number of devices have been developed to meet the need for more secure dialing of account codes for telephone calls in a portable preprogrammed dialer device. Such devices are convenient in that they relieve the calling party from manual entry or annunciation of a large number of digits in order to place a call.

In U.S. Pat. No. 4,126,768 issued to Grenzow and incorporated herein by reference is shown a portable digit outpulser enclosed in a credit card size case which may be used to acoustically generate DTMF signals corresponding to one or more frequently dialed numbers. In this disclosure a ROM memory contains the dial out data.

U.S. Pat. No. 4,817,135 and U.S. Pat. No. 4,941,172 issued to Winebaum and U.S. Pat. No. 5,181,744 issued to Bethell and all incorporated herein by reference disclose a dialer device in which telephone numbers are preprogrammed by masking the chip in advance with a stored set of numbers. These inventions are useful in that the dialer device does not require custom programming and therefore every label attached to many dialer devices can be preprinted with the same telephone number as hardwired on the chip by the manufacturer. However in the case of a major telecommunications carrier such as AT&T or MCI, several million different account authorization codes may be useful along with a hardwired access code to automate the entry of account authorizations for the end-user. The masking/fabrication process is expensive and does not allow for variable data such as millions of different account or authorization codes to be programmed in dialer devices.

In U.S. Pat. No. 4,882,750 issued to Henderson et al and U.S. Pat. No. 5,210,790 issued to Lin and incorporated herein by reference are shown programmable dialer systems in which a releasable electrical connection is made with a dialer device to download dialing instructions from a programming source such as a personal computer or the like. The limitation of such an approach is that there is not provided an efficient manner for ensuring that the information programmed in the dialer device is the same as the variable information printed on the label which is affixed to the device.

In U.S. Pat. No. 4,995,077 issued to Malinowski incorporated herein by reference is described one dialer device with two different programmable numbers programmed in a releasable electrical manner. Typically, programmable dialer devices of this type are imprinted with non-variable advertising information such as logos and 800 number information corresponding to preprogrammed telephone numbers and do not usually contain variable printed information that corresponds to the information programmed.

This prior art does not teach how to print variable data on many different dialer devices which corresponds to variable programmed data such as account or authorization number information and non-variable data such as logos and other information in an accurate and efficient manner. It is important to have account numbers printed on the dialer in a manner similar to conventional credit or prepaid calling cards because acoustically coupled dialers do not work with 100% accuracy due to faulty or blocked telephone sets, loud ambient noise, network problems and the like. Therefore the end-user should be able to refer to a printed account number on the dialer for manual dialing when a good acoustic coupling cannot be made.

In U.S. Pat. No. 5,343,519 incorporated herein by reference is shown a dialer device in which a display is integrated into the dialer which may be used to view programmed information. However this conventional display adds significant cost to the dialer device and can fail if the power source for the dialer runs low. In this patent is shown a programming fixture adapted to program a multiplicity of dialer units using a SCSI interface with a personal computer. No solution is offered regarding the imprinting of variable information that corresponds to data programmed in the dialer units.

U.S. Pat. No. 4,535,204 discloses optical reading of telephone numbers stored in a barcode format on various types of storage media, followed by automatic dialing of a telephone number after a user passes a reading wand over the proper barcode.

U.S. Pat. No. 4,266,102 issued Stanley et al. discloses an automatic dialer utilizing a device capable of reading a phone number of a business card and storing it in a memory, which later can be used for dialing. The device converts this information into a set of dial signals understandable by the telephone line.

U.S. Pat. No. 4,672,661 issued to Clark et al. discloses a card-like device having a strip of magnetic material with magnetically encoded number information. Upon insertion of the device into a modified telephone apparatus equipped with a magnetic reader the telephone apparatus can retrieve encoded numbers on the magnetic strip number.

U.S. Pat. No. 3,124,659 issued to Andregg et al. discloses an electromechanical device using a card having series of holes for encoding the telephone number thereon. In this type of device, the card serves merely as data storage and is not by itself capable of generating signals understood by the telephone line.

U.S. Pat. No. 3,870,830 issued to Liu discloses an optical reader which uses a card with series of holes encoding the telephone number(s). Other patents are concerned with how active electronic elements can be fused or otherwise connected into a credit card size structure. See for example U.S. Pat. Nos. 5,026,452 and 4,966,857. Also relevant in the field are U.S. Pat. Nos. 4,822,990, 5,066,047, 4,117,542 and 5,166,501. Also see French patent reference 26 40 549 published Jun. 22, 1990.

Generally the above described inventions fail to address the need for integrated variable programming and printing in an improved autodialing device and programming/printing method.

In small production lots this is not a difficult problem to monitor and control. In the prior art systems small production lots may be separately programmed and labels may then be separately generated with variable and non-variable data which are applied to the corresponding preprogrammed dialer units. Typically one supplier or operation prints the label or dialer and another supplier or operation programs the dialer unit. These processes are not integrated as with conventional credit card encoding and imprinting operations because of the unique configuration and assembly requirements of autodialer devices. Credit card operations are not easily adapted to receive and process dialer devices for programming and imprinting.

When addressing higher production volumes from several hundred thousand to several million dialer units, the conventional prior art programming and printing solutions prove inadequate and unworkable. To ensure that the proper label or imprint is attached to the appropriate corresponding programmed dialer is a labor intensive process that is prone to error. In addition it is desirable to centralize the programming and printing operations in one location rather than separate suppliers or facilities for printing and programming operations. This is important because the account number information can be regarded as money in that telephone charges can be incurred by anyone using them. For security reasons, it is important to control the account number data so that fraudulent charges cannot occur from someone improperly using the account numbers.

It is also noted that none of the above prior art dialer devices or methods is capable of receiving programming instructions that include data other than DTMF generation information. Typically the above devices are preprogrammed on a mask level or with a serial or row and column interface with DTMF programming instructions only. Because of the promotional nature of these dialer devices, it may be desirable to preprogram other information that could be displayed or annunciated from within the dialer device.

The invention described herein addresses the need for a reliable and efficient method and apparatus which combines printing and programming of variable and nonvariable data in dialer devices. The invention overcomes the inherent inefficiencies and shortcomings of the prior art methods. It further provides for alternative data to be programmed in a dialer device besides instructions related to DTMF signal generation in a novel manner.

SUMMARY OF THE PRESENT INVENTION

The present invention provides an improved dialer programming system and device in which a dialer may be programmed and printed with variable data from a common data source. The assembled dialer unit may have nonvariable preprinted information such as background artwork and logo information which is the same for all dialer units and is imprinted on the surface of the dialer device or imprinted on a label attached to the dialer device. The assembled dialer unit may be loaded into a combined printing and programming process in which variable data such as telephone number and account number data can be programmed and printed on the dialer device. The improvements in the invention herein described provide for accurate and efficient programming and printing of dialer devices.

The dialer device may also have non-DTMF data programmed in advance such as display data corresponding to a promotional message or instructions on use of the device, such as "Hold dialer firmly against mouthpiece and press button A" which may be seen on an integrated display member. Alternatively the dialer device may have sound data corresponding to a voice annunciation such as the message "Thank you for using AT&T" and/or DTMF tones, received in the dialer device in a digital record/playback type integrated circuit. Such a device would eliminate the need for a DTMF generator and an oscillating crystal, thereby reducing the cost of the dialer device. Alternatively other sound or display data instructions could be hardwired in a ROM rather than custom programmable and used to provide additional functionality to the dialer device.

One object of the invention is to provide a more accurate and efficient method of handling, programming and printing dialer devices in large production lots that may also accommodate smaller production lots when necessary.

Another object of the invention is to teach an integrated dialer programming and imprinting system and apparatus that can accommodate dialer devices with minimum labor or operator intervention at high production speeds.

Another object of the invention is to teach an alternative embodiment in which an improved programming interface is shown that will allow other non-DTMF dialing data to be programmed in a dialer device such as textual display information, recorded speech and DTMF sound data.

Another object of the invention is to teach an improved dialer device that can generate other non-DTMF data that is preprogrammed.

Other objects and advantages of the invention will become apparent after review of the invention described hereinafter.

BRIEF DESCRIPTION OF THE DRAWINGS

For a better understanding of the invention as well as other objects and features, reference is made to the following description which is to be read in conjunction with the accompanying drawing wherein.

DETAILED DESCRIPTION OF THE INVENTION

Figure 1A:
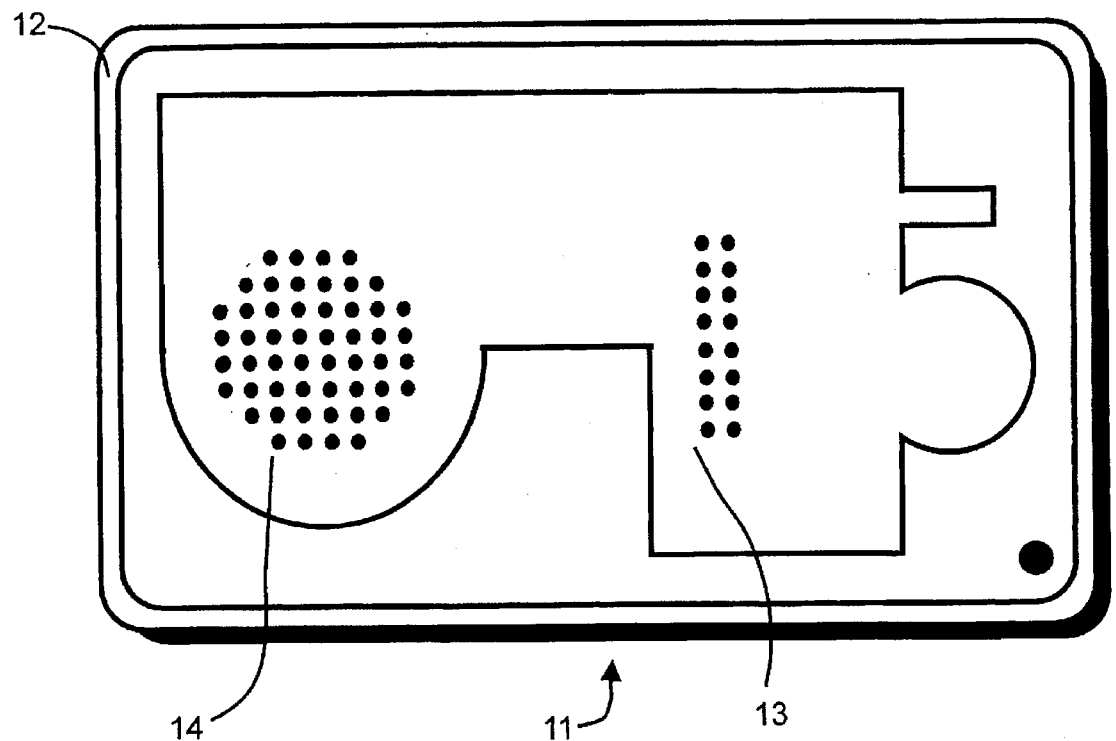
FIGS. 1a, 1b, 1c and 1d are an exploded view of an autodialer device and assembly according to a preferred embodiment of the present invention.
Figure 1B:
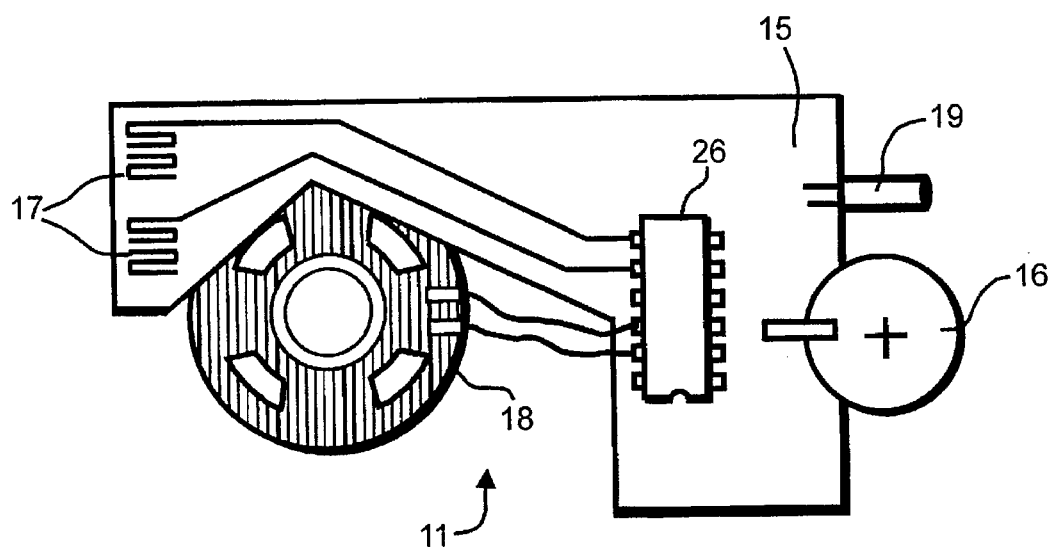
Figure 1C:
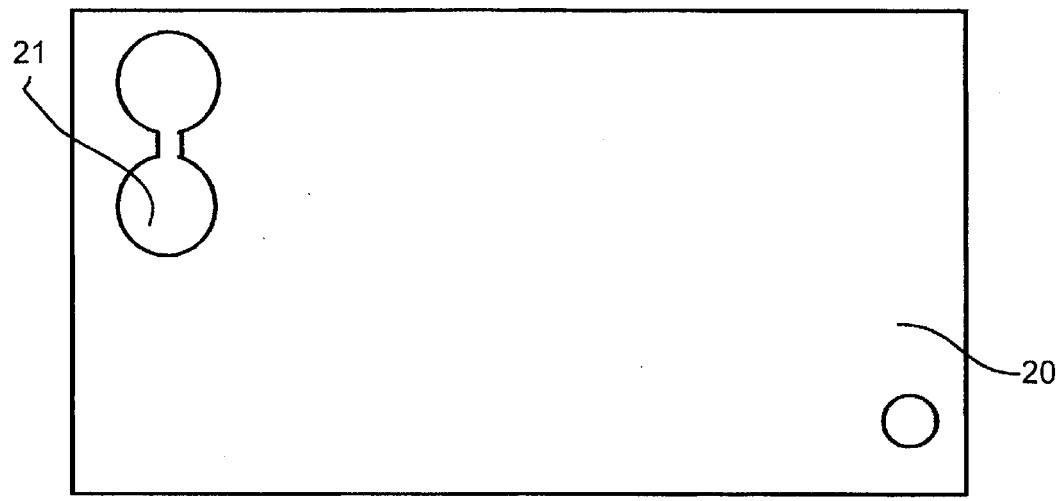
Figure 1D:

FIGS. 1a, 1b, 1c and 1d are an exploded view of the credit card dialer of the preferred embodiment. Credit card dialer device 11 comprises a plastic case housing 12, programming port 13, sound output port 14, printed circuit board 15, integrated circuit 26, power source 16, switch contact 17, transducer 18, and crystal 19. Further is shown label-spacer material 20 with conductive switch cutout 21, label/switch membrane material 22, non-variable printed material 23, variable printed material 24 and raised conductive switch contact 25.

ASSEMBLY OF THE DIALER DEVICE

The dialer unit of the preferred embodiment is assembled in the following fashion.

First the plastic case housing 12 is mold injected, trimmed, and prepared for receipt of the assembled printed circuit board. The printed circuit board 15 is made, trimmed and prepared for die bonding, surface mount or through-hole attachment with integrated circuit(s) 26 that is capable of regenerating a dial signal. In the preferred embodiment the SGS Thomson Model MK 53732F integrated circuit is used to store and generate DTMF signals. However other DTMF generators such as the KS5820 by Samsung or a custom integrated circuit could be used without departing from the spirit of the invention.

In one preferred embodiment, an integrated circuit 26 contains a first non-programmable or non-reprogrammable telephone access number in memory and masked on the chip or programmed at time of manufacture as in U.S. Pat. Nos. 4,817,135, 4,941,172, or 4,882,750. The access number is preprogrammed to be used to access the special exchange, for example 1-800-CALLATT, which can also be printed along with other nonvariable data on the label/switch 22. A second programmable memory can be provided that may be programmed with a unique account or authorization number corresponding to an end-user having an account at the special exchange. This unique account number can be programmed after the dialer device 11 is manufactured/assembled and printed as described hereinafter.

This approach has an advantage over the prior art dialer devices and programming systems, for example U.S. Pat. No. 5,343,519 issued to Feldman. In Feldman, both the access number and the account or authorization codes must be programmed. In high volume production the additional time required to program and print two sets of numbers can add significant time and cost to manufacture the device. By preprogramming an access number in advance at the factory, production of the unit after assembly with printed and programmed variable data can be done more cost effectively and the likelihood of error is reduced. Because data that comprises the access number for a special exchange is used by all users of the dialer device 11, the data may be masked on the chip or programmed during manufacture by some means not accessible after assembly. For example, dialer device 11 could be provided without any programming ports 13 in the case housing 12 for the access number and the electronics subassembly could be programmed prior to attachment to the case housing 12. In this case, the access number can be programmed in a releasable electrical manner as in U.S. Pat. No. 4,882,750 or some other method to be described herein.

This programming process can also be used to test the dialer circuit operation when assembling the dialer unit at the factory. The first access number memory can be tested and preprogrammed prior to assembly of the dialer unit and the second account or authorization code memory can be programmed separately at a later time after assembly of the dialer unit through programming port 13 in case housing 12.

Label/switch material 22 can be preprinted with non-variable data 23 corresponding to the first access number memory and other optional information during the non-variable printing operation with, for example, "1-800-CALLATT" and logo or other information. Label/switch material 22 can then be printed with variable data corresponding to the second account or authorization code memory during the variable programming and printing operation after the dialer unit 11 has been fully assembled.

This second printing operation can be from an inkjet or thermal transfer process to print, for example, the account code "46738762914", which comprises the variable print data 24. When selected by a user who depresses raised conductive switch contact 25, the number sequence first corresponding to the access number, for example "1-800-225-5288" (1-800CALLATT) can be generated. Then the user may depress a second conductive switch contact 25 and a second account or authorization code can be generated.

By aligning sound output port 14 in dialer device 11 against the mouthpiece of a telephone, the generated DTMF tones will dial a first number through the touch-tone dialing system that corresponds to the access number hereinbefore described. Once the special exchange answers, the second sequence of numbers previously described will transmit the account or authorization code to the exchange, thus accessing the end-users' account. Thereafter, a telephone number can be dialed by the user through the exchange in the conventional manner and billing for the call is credited to the users' account. Alternatively, there need not be two conductive switch contacts 25 in dialer device 11. For example, in U.S. Pat. No. 5,377,263 is shown a slider type selector switch in which different memories can be selected prior to actuation of a dial signal by depression of a single conductive switch contact.

Alternatively, the DTMF generation means may include logic in which a first depression of a single conductive switch contact 25 would cause a generation of a first dial sequence and a second depression of the same conductive switch contact would cause a generation of a second dial sequence.

In yet another embodiment, a preprogrammed pause could be inserted between the access number memory and the account or authorization code memory. The memory for both the access number and the account or authorization data could be one contiguous memory in this embodiment. The second dial signal could be responsive to the elapse of a predetermined period of time after generation of a first dial signal, or upon receipt of a particular signal from the telephone set or telephone exchange or end user, before generation of a second dial signal would occur.

For example, one actuator switch could be provided which responds to a first and second actuation sequence to generate a first and second sequence of numbers. The second sequence of numbers could be inhibited during the outpulsing of the first sequence of numbers even if the actuation button was depressed during dialing. Then after dialing of the first sequence of numbers, a second actuation would cause the second sequence of numbers to be generated. After an initial time out without depression of the actuation switch, the control circuitry could default back to a generation of the first sequence of digits upon the next depression of an actuation sequence. Another approach would require one depression of a switch means within a prescribed period of time for a first dial sequence generation corresponding to an access number. Two depressions of a switch means within a prescribed period of time would cause a second dial sequence generation corresponding to an account or authorization code.

The above described alternative embodiments would eliminate the need for two buttons on the dialer device 11 for specialized applications and help reduce overall component count and cost of manufacture of a dialer apparatus.

Referring again to FIGS. 1a-1d, the integrated circuit 26 is diebonded or affixed to the printed circuit board 15 and the other components such as the crystal 19 and power source 16 are assembled to, complete the dialer circuit. Crystal 19 may be a piezo electric oscillator which provides a standard 3.579545 Mhz frequency such as available from Kyocera/Murata and Seiko companies or ceramic resonator with the appropriate capacitors as is well known in the art. Transducer 18 may be similar to the voice coil type transducer offered by ICC, model number S120 RL-M 100 which has a 100 ohm resistance and is 3 mm thick, or a specialized piezo type transducer adapted to accurately generate frequencies within the DTMF signal range. The power source 16 in the preferred embodiment is the Sanyo CR 2016 or CR 2025 which is a 3 volt lithium power source 16 that measures between 1.8 and 3 mm thick and is particularly adapted to the thin form factor required in a credit card type dialer device 11.

The assembled circuitry may be functionally tested prior to attachment to the case. As described earlier, the access number could be used as the test data and conveniently programmed in the first memory position for each dialer tested. The transducer 18 is then attached to the plastic case housing 12 along with a protective grill material which can be of a ferrite composition to aid in shielding magnetic fields from sensitive magnetically encoded media that may come in contact with the dialer device 11 such as other credit cards or computer diskettes. Further the grill cloth material protects the surface of the transducer 18 from attracting foreign debris from outside the plastic case housing 12 after assembly.

Typically the transducer 18 is adhered in place to the case housing 12 to prevent vibration during operation. Then the printed circuit board assembly is soldered to the transducer 18 and fixed to the case housing 12. Spacer material 20 is adhered over the assembled components to enclose the components in the case housing 12. This spacer material 20 may be a mylar sheet which is die cut to accommodate the switch contacts on the printed circuit board and provides a rigid surface for the label/switch material 22 to adhere to. The spacer material 20 has double sided adhesive material on both sides which is used to adhere to the label/switch material 22 on the outside and is used to adhere the spacer to the dialer on the inside.

Alternatively the spacer material 20 can be omitted from the design and the printed circuit board may be enlarged to substantially enclose the dialer housing and provide a rigid surface underneath the label/switch material 22. Cutouts to accommodate the transducer 18 and power source 16 can be made in this design of the modified printed circuit board. The printed circuit board has a conductive pattern which actuates the dialer output circuit when place in contact with the conductive carbon surface on the label/switch material 22. Cutouts are provided in the switch area of the spacer to accommodate the switch contacts if a spacer material 20 is used.

The label/switch material 22 may be a membrane known as Lexan manufactured by General Electric, model number 8010 which is a glossy finish and 8A13 or 8B35 which is a non-glare finish. This lexan material is used in the preferred embodiment due to the fact that it can be vacuum formed or embossed into a dome shape that can act as a switch to actuate the dialer. The material can be formed into elevated dome switches with a conductive carbon material applied on the inner surface of the dome switch. This conductive carbon material contacts the conductive pattern on the printed circuit board to actuate the dialer when depressed. The switch minimizes the component count for the dialer and is cosmetically appealing. In low light environments such as in a pay phone, the switch may easily be found by feeling for the raised switch surface on the label/switch. Alternatively, raised metallic baumer dome switches may be attached to the printed circuit board 15 to be used in place of raised conductive switch contact 25 in conjunction with an adhesive label overlay material.

PRINTING OF NON-VARIABLE DATA ON THE LABEL/SWITCH MATERIAL

The clear lexan or other label material 22 may be printed with a four color process on the reverse side which faces the electronic components in the dialer case. The advantage of printing on the reverse side of the label material is that the printed non-changeable information 23 such as company logo or graphical images is protected from being scratched or marred during normal dialer use.

The printing of the label on the reverse side is not necessary or integral to the invention. For example, to reduce cost, the label material could be provided in a colored material such as white. Logo and other nonvariable graphic data 23 could be printed on the face side of the label/switch material 22 along with variable data such as account codes after the blank label/switch material 22 is attached to the dialer unit.

The label/switch material 22 can be provided in a diecut form in advance in sheet, stack, or roll form to accommodate a variety of printing operations and processes. In the preferred embodiment the material is clear lexan material diecut in a stack of preformed labels. Color key and film artwork is provided by or prepared for a customer to create print plates for four color process printing. Other printing methods known to those skilled in the art could be adapted without departing from the spirit of this invention.

A printing device such as manufactured by Plextor out of Japan, model numbers AR-010 and UV-015 can be modified to receive a stack of diecut lexan label/switch material 22. In this implementation, the credit card sized blanks are loaded in a stacking tray. The AR-010 device automatically loads a label/switch from a stacking tray and passes the blank stock to a printing plate where ink is applied to the blank label/switch 22.

The blank stock is forwarded to the UV-015 which receives the newly printed stock and cures a special ink by exposing the printed surface to an ultraviolet light source. This is particularly useful in that drying time for the ink is almost instantaneous. Typically such machines are rated at 4–6000 prints per hour and are thusly well suited for high volume print production. After curing the ink, the UV-015 unloads the printed piece to an output stack where printed labels can be forwarded to the next operation for attachment to the dialer units for variable data printing and programming. The printing and programming may be done before or after the attachment of the label/switch to the dialer unit.

Assembled dialer units await the attachment of the printed label/switch blanks. The dialer unit is assembled with the adhesive spacer material 20 or printed circuit board 15 enclosing the electronics in the case housing 12.

The adhesive spacer material 20 is firmly attached to the flat surface of the printed circuit board, perimeter of the recessed case housing 12, and other components such as the back side of the transducer 18 and power source 16. The outer exposed surface of the spacer 20 is also covered with a strong adhesive covered by a protective material. The protective material is removed from the spacer to expose an adhesive surface, the printed label/switch is aligned, and the label/switch is adhered to the assembled dialer unit in an automated or manual fashion. The fully assembled dialer can then be forwarded to the variable data programming and imprinting process.

VARIABLE DATA PROGRAMMING AND IMPRINTING PROCESS

The preferred embodiment uses a system offered by Innovative Equipment Inc. to receive data corresponding to programming and printing instructions. The device handles the movement of dialer cards in an automated fashion and manages the programming and printing operations. Data can be supplied from the customer by way of modem or other electronic means and typically contains information such as account or authorization codes, PIN data, names, telephone numbers and graphical images or other data.

In addition, each customer record may include individual shipping data in such cases where a customer wishes the programming and printing supplier to fulfill the order and ship directly to end-users. In these cases, shipping data can be transferred to a label printer to be attached to packaging for shipment.

Control data such as registration information can also be specified to determine where variable data will be printed on the label/switch. Other information such as color or font type preferences can also be specified. This data can reside in the programming/printing apparatus or can be transferred to the apparatus from another device or electronic or manual source.

The data can be used to generate shipping, printing and programming instructions and can also be used for quality control testing, audit, and other purposes to manage production, quality and work flow. The programming and printing data described herein can also be randomly generated for the customer in such cases where an existing customer base and customer records do not need to correspond with existing records.

Figure 6:
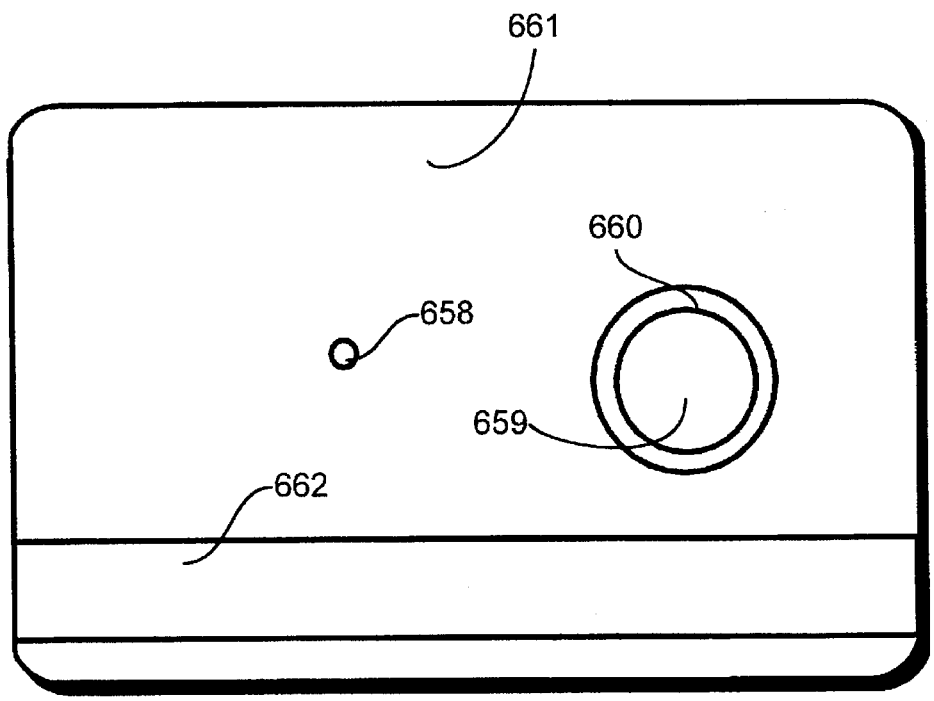
FIG. 6 is a bottom view of an acoustically programmable dialer device, showing the transducer opening and sound input means opening.
Figure 7:
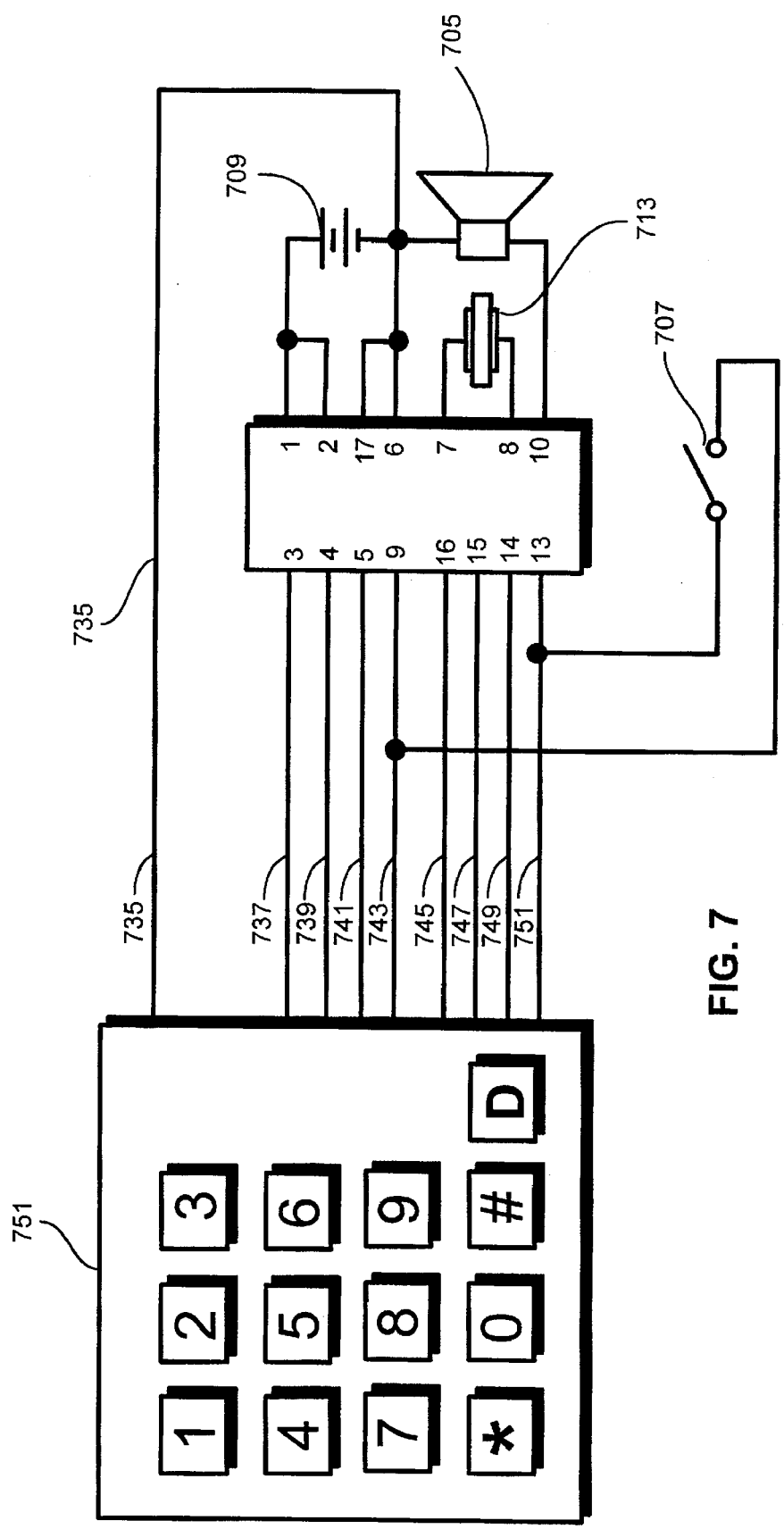
FIG. 7 is a schematic drawing showing a circuit diagram of an acoustic DTMF generator circuit used to program a dialer device as in FIGS. 5 and 6.

In the case where a dialer device is designed in a credit card thin form factor, a magnetic stripe could also be encoded with dialing data such as is conventionally used in traditional calling cards with a magnetic stripe, and as shown in FIG. 6 in magnetic stripe 662. In this case, the programming operations could include a programming operation in addition to the acoustic dialer programming step 217 shown in FIG. 2*b*. The additional programming operations would comprise a means for encoding a magnetic material attached to the dialer device. Such a calling card of this improved dialer device would have the ability to generate an acoustic dialing signal and also could be used in a magnetic stripe reader. This dialer device and calling card would have the advantage of dialing on almost all telephones, as nearly all telephones are adapted to receive either an acoustic signal or input from a magnetic card reader.

In addition, the lexan material can be embossed with braille characters corresponding to access telephone numbers and authorization codes for the visually impaired. Alternatively the embossing could be in the form of raised alphanumeric characters similar to those seen on a conventional credit card. In either case previously mentioned such embossed data would be applied to the label surface as a result of programming and imprinting instructions from the improved system. The embossing operation would precede attachment of the label/switch membrane material to the dialer for programming in this case.

Partial authorization codes can be printed and programmed in the dialer devices, requiring an end user to manually enter a 4 digit pin code by the telephone keypad or integrated keypad on the dialer device as is conventionally done with credit card applications.

Figure 2A:
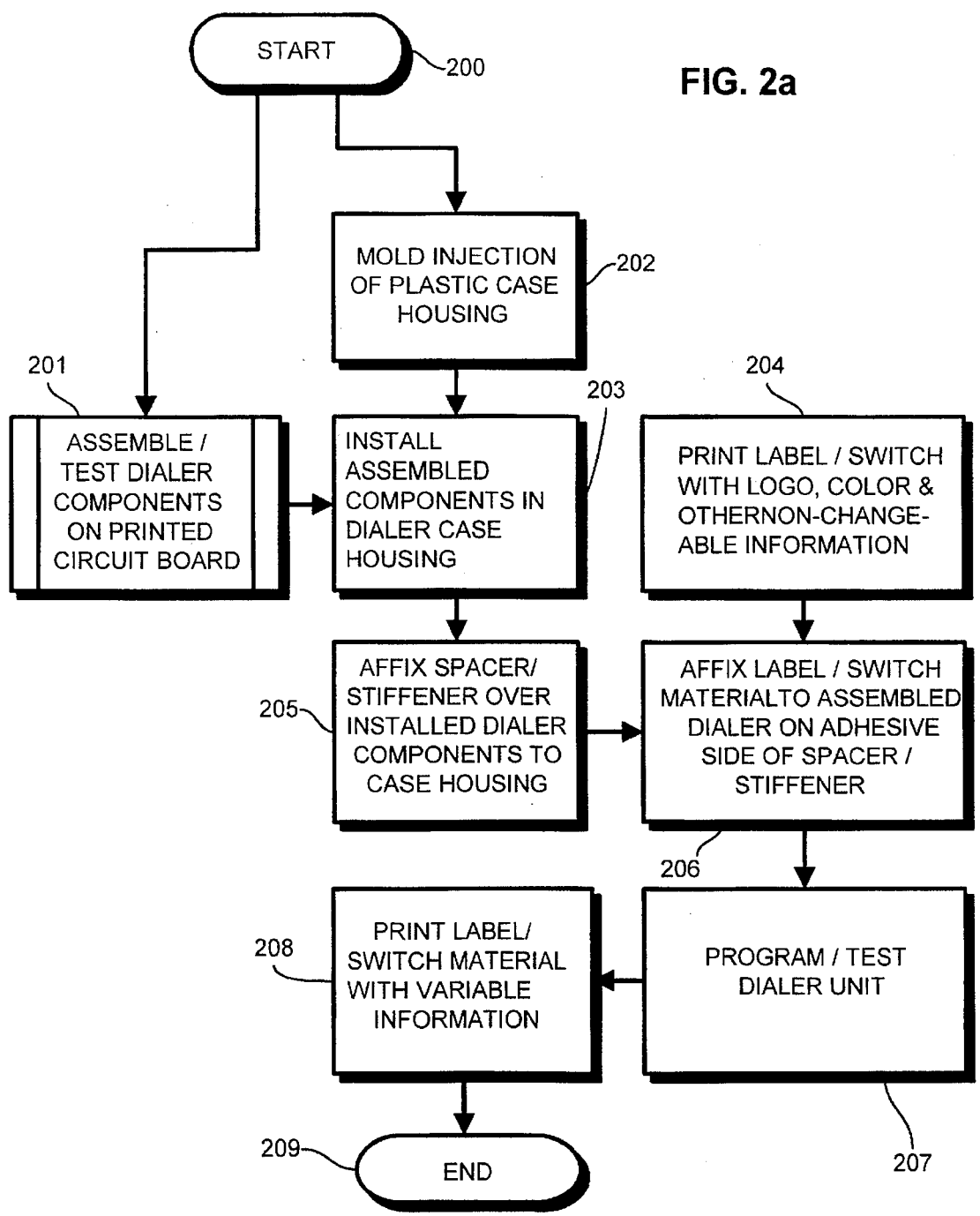
FIG. 2a is a process flowchart according to the preferred embodiment for assembly of an autodialer device and programming and printing of fixed and variable data.

In FIG. 2*a* is seen a process flow chart for the assembly, printing and programming of dialer devices according to the preferred embodiment. First the plastic case housing 12 is mold injected in step 202 and dialer components are assembled and tested on a printed circuit board in step 201. The assembled and tested components are installed in the dialer case housing 12 in step 203. Next the spacer/stiffener is installed over the installed dialer components and printed circuit board to enclose the dialer case housing 12 in step 205. Separately, any artwork for the non-variable data (such as logo or other data) has been printed on the lexan label/switch material 22 as previously described in step 204. The printed label/switch material 22 is applied to the adhesive surface of the spacer/stiffener side of the dialer device 11 after the protective covering has been removed from the spacer/stiffener in step 206. Once the dialer unit has been received by the programming and printing apparatus, programming and printing of variable information can occur as described previously and in the following description in steps 207 and 208.

Figure 2B:
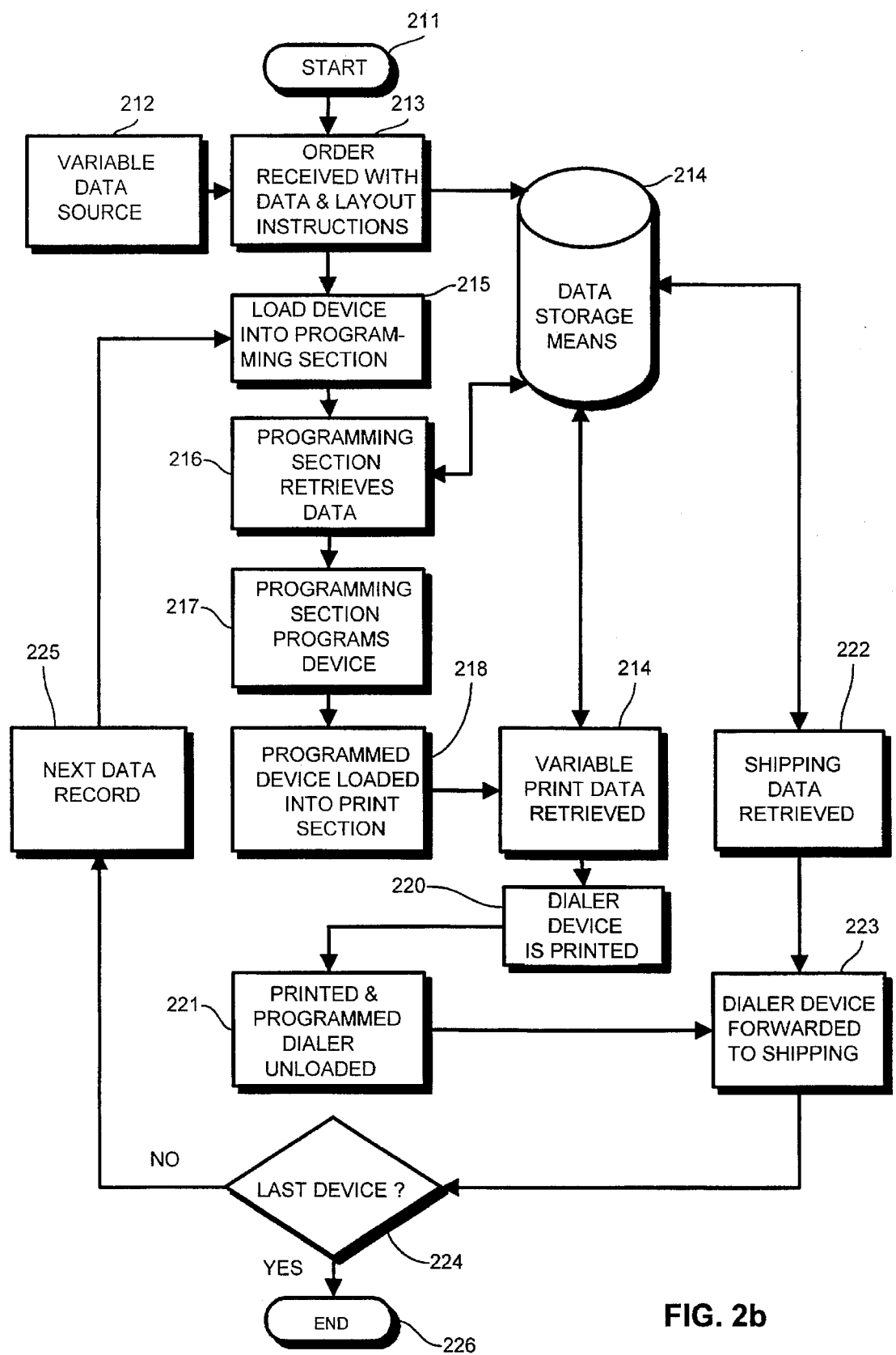
FIG. 2b is a flowchart according to the preferred embodiment for the receipt of variable data by a programming and printing process and operational sequences for processing a dialer device.
Figure 2C:
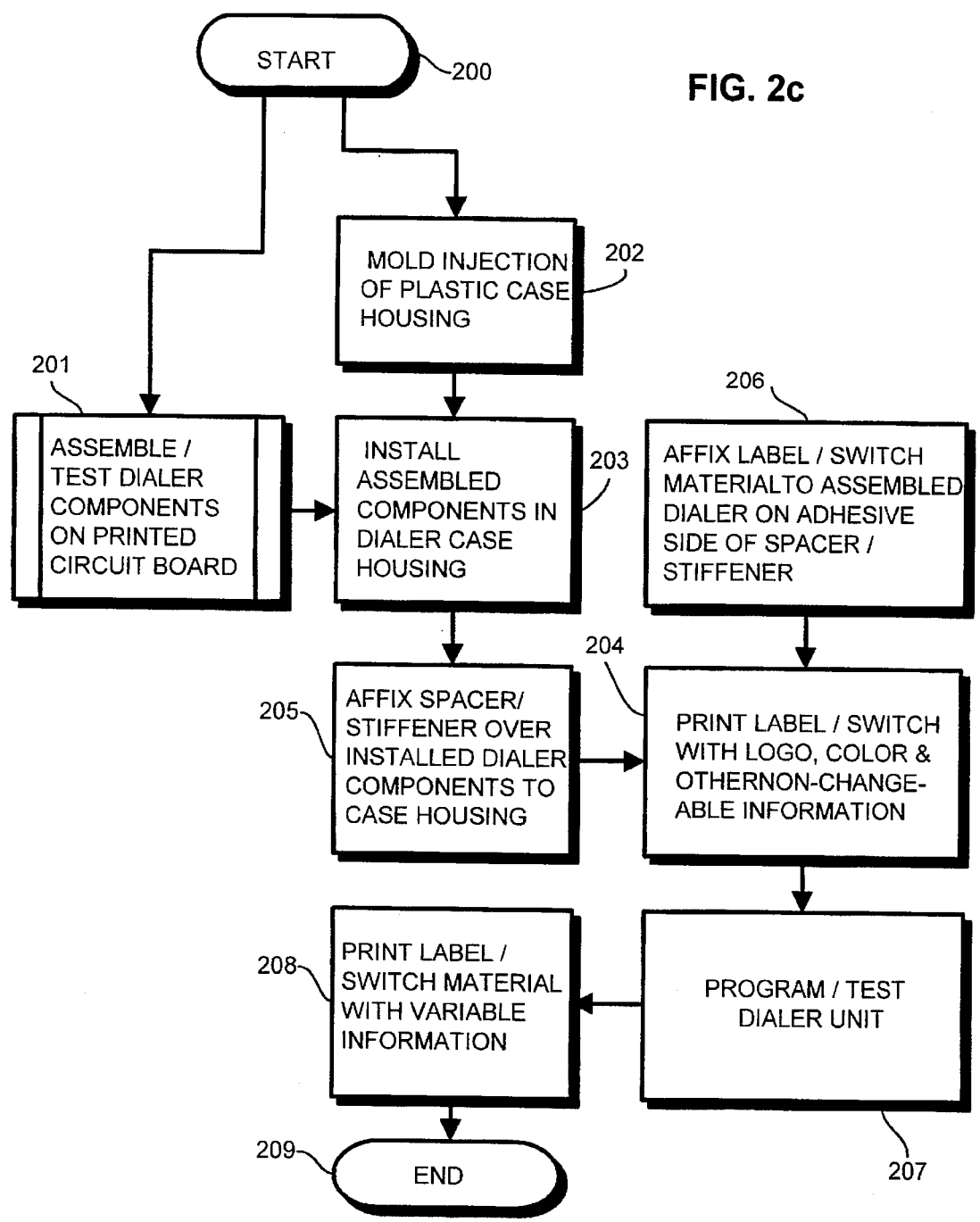
FIG. 2c is an alternative process flow chart for dialer device assembly and programming and printing of fixed and variable data.
Figure 2D:
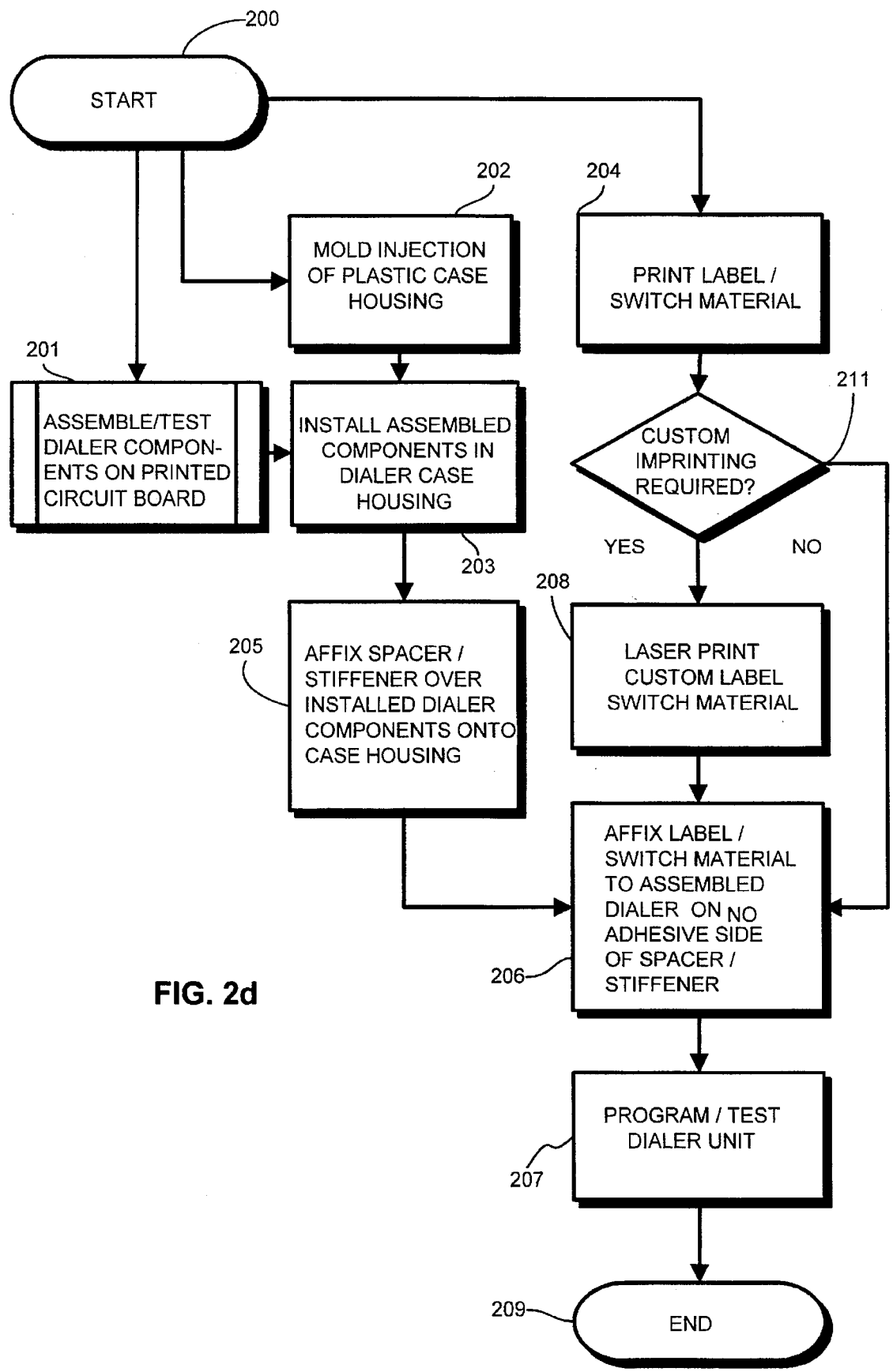
FIG. 2d is another alternative process flow chart for dialer device assembly and programming and printing of fixed and variable data using bar codes or optical character recognition for programming input instructions.
Figure 2E:
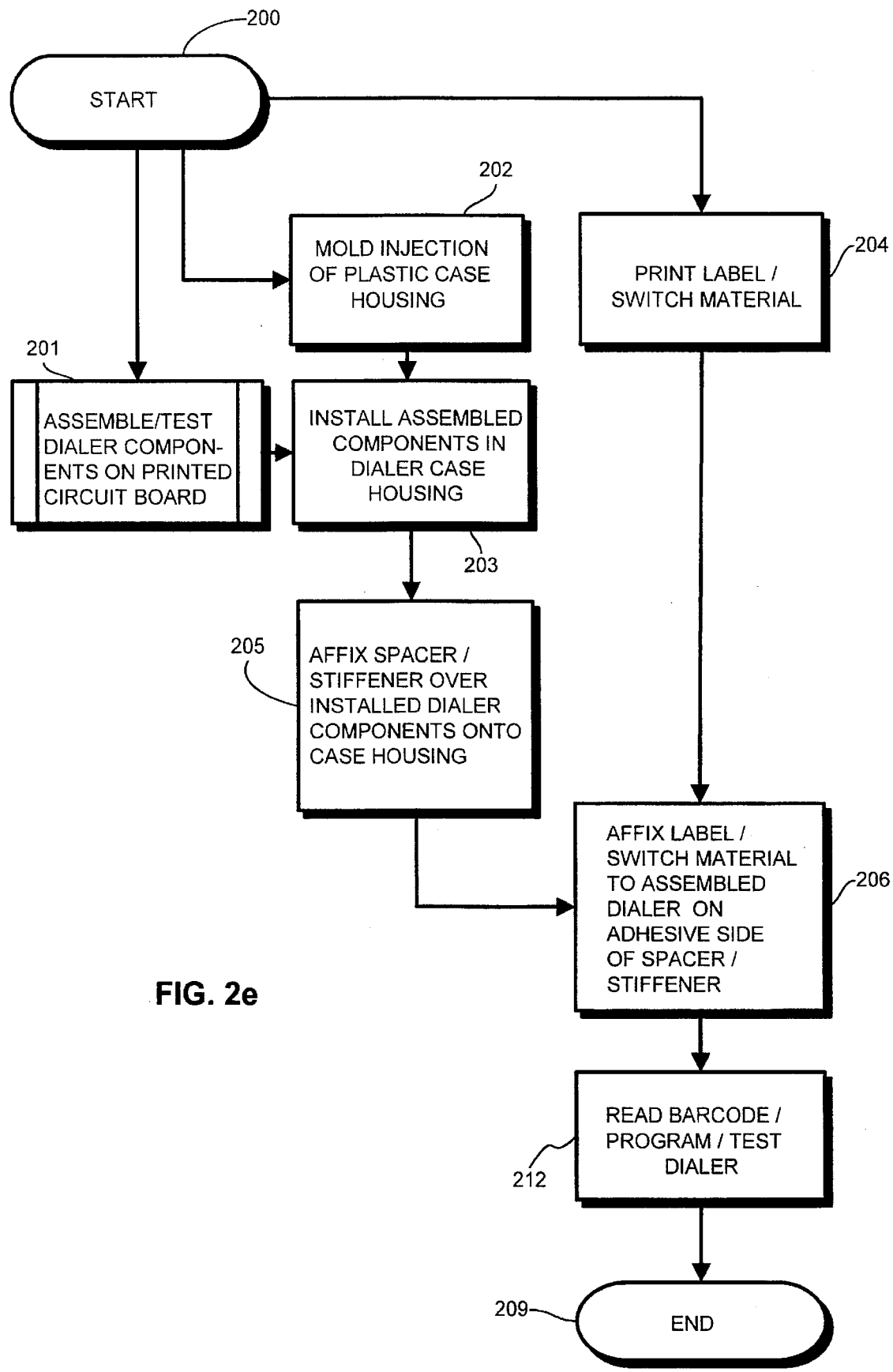
FIG. 2e shows an alternate process flow chart for dialer device assembly, programming and printing of fixed and variable data using an adhesive clear transfer material attached to the dialer label surface.
Figure 2F:
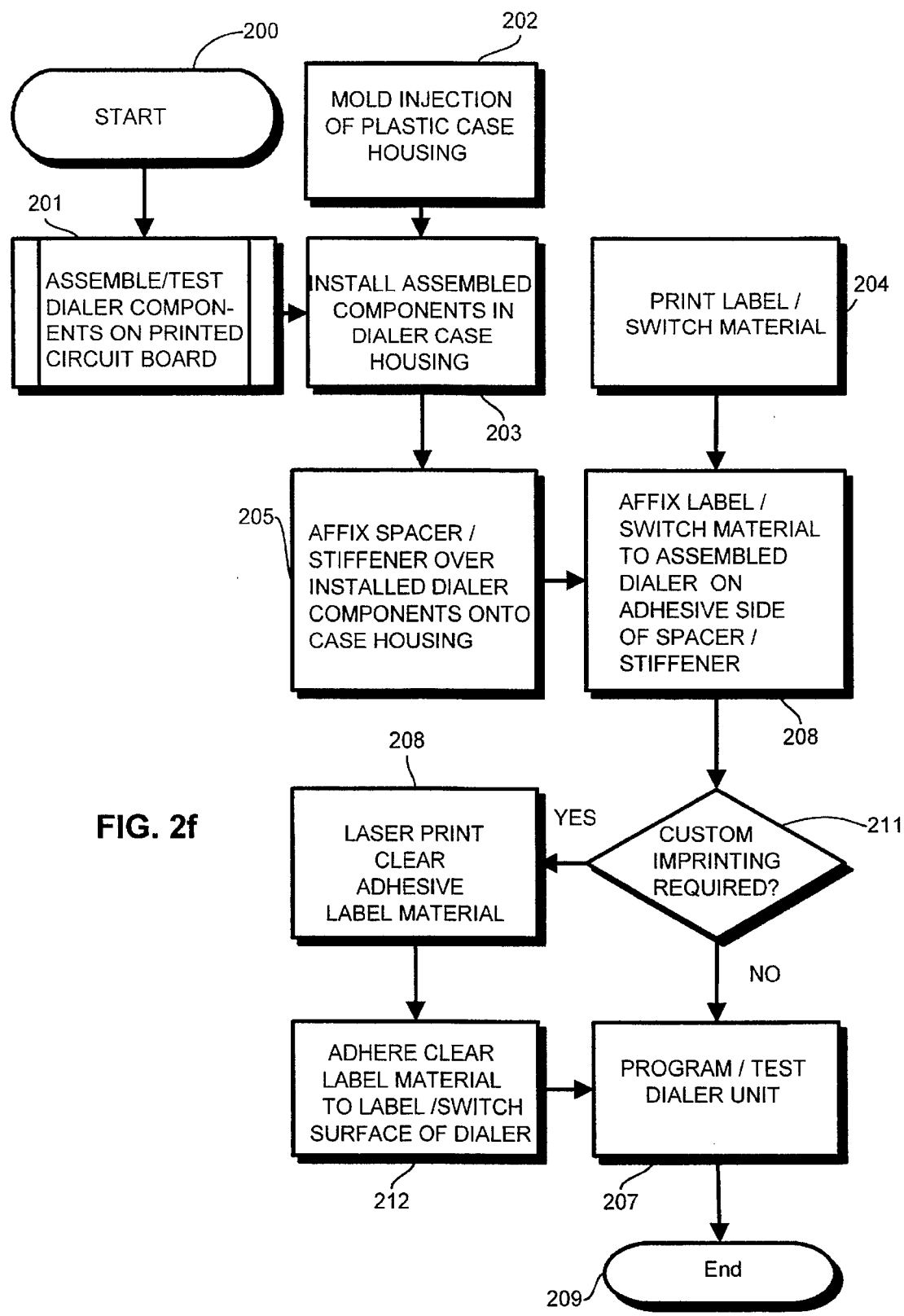
FIG. 2f shows a flow chart according to an alternative embodiment for the receipt of variable data and operational sequences for processing a dialer device.

Referring to FIG. 2*b* the process begins in step 211 with variable source data supplied in a manual or electronic form in step 212 supplied to step 213. The data is then transferred to a data storage means in 214. In step 215 a dialer device is loaded into a programming section to be described later. In step 216 the programming section retrieves data from the data storage means in 214 and the programming section programs the dialer device in step 217. Alternatively, the programming section can also test and verify the operation of the dialer device and the accuracy of the programmed data in this step. Then in step 218 the programmed dialer device is loaded into a print section to be described later and variable print data is retrieved from a data storage means in step 219. In step 220 the dialer device is printed in the print section and then the printed and programmed dialer device is unloaded in step 221 to be forwarded to shipping in step 223. Also at this point additional shipping data can be retrieved from a data and storage means in step 222 to facilitate fulfillment of orders for dialer devices. In step 224, a check is made as to whether the last dialer device has been programmed and printed. If not, then in step 225, the next data record is retrieved from the data storage means in step 215. Otherwise the process is terminated in step 226. Alternatively, the process shown in FIG. 2*b* could be adapted so that the programming of a dialer device in step 217 and the printing of the dialer device in step 220 were done simultaneously or substantially at the same time.

Figure 3:
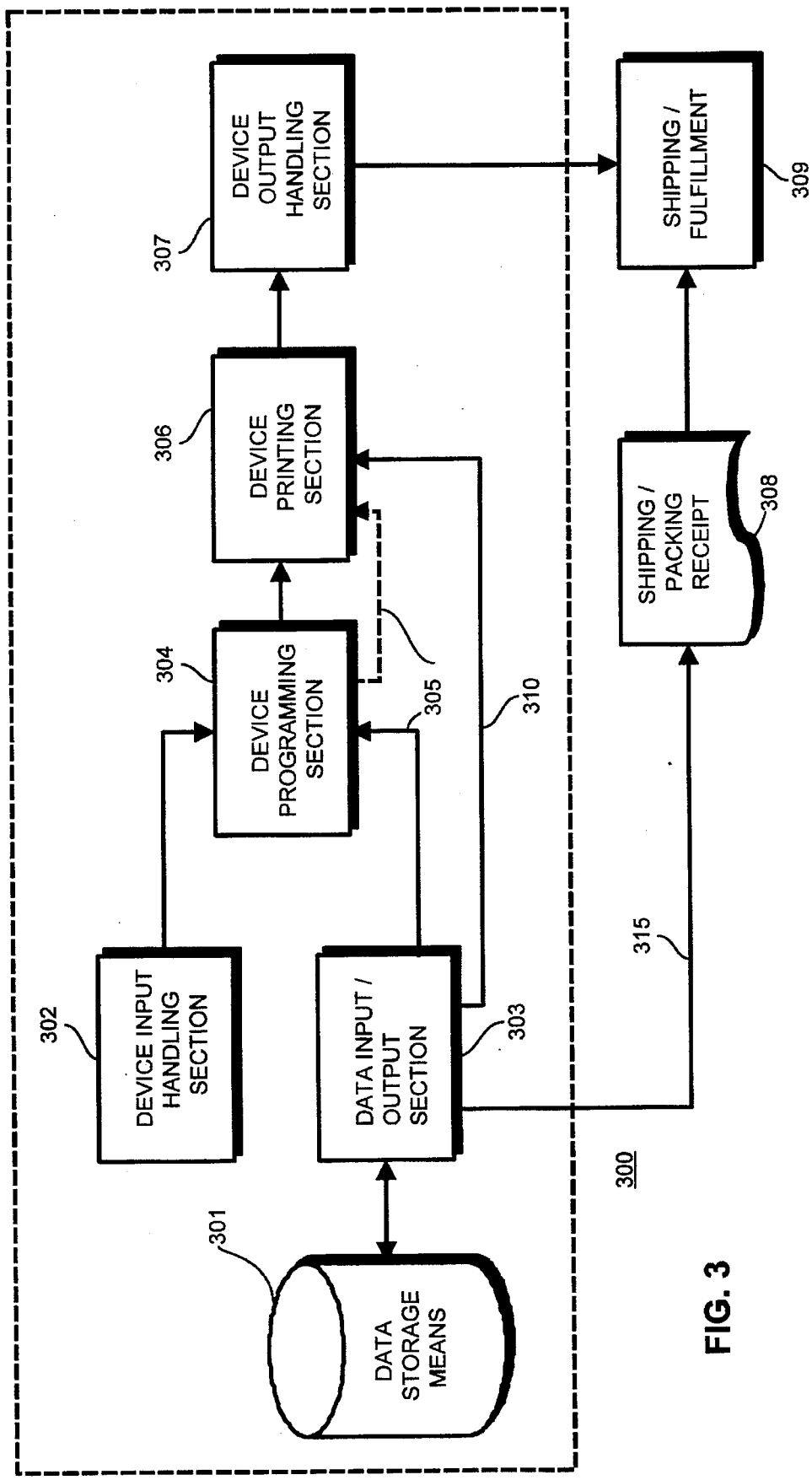
FIG. 3 shows a block diagram of a dialer device printing and programming apparatus and system.

In FIG. 3, the programming, printing and other data is received by modem, diskette or manual entry at the data input/output section 303 and stored in a storage means 301 for later use by the printing/programming apparatus 300. The exemplary apparatus for the preferred embodiment is manufactured by Innovative Equipment, Inc. Their device is conventionally used for printing of variable data with inkjet printing on conventional plastic prepaid calling cards. However, the device can be modified to incorporate the addition of a programming/test section 304 as indicated. The necessary hardware for the movement and handling of dialer devices can be customized to accommodate the loading and unloading of dialer devices in the programming/printing sections 304 and 306 by the device input and output handling sections 303 and 307.

The assembled and labeled dialer device 11 is loaded into a device input handling section 302 which transfers the dialer device 11 to a device programming section 304. The data input/output section 303 retrieves the stored programming data from a data storage means 301 and transfers the data to the device programming section 304 via data connection 305. The device programming section 304 then executes programming instructions and data signals are sent from the device programming section 304 via a releasable electrical programming interface with the dialer device 11. As previously discussed, such programming instructions could also be sent via an acoustic, optical or other wireless means rather than a releasable electrical connection.

Test procedures can also be employed at this point whereas signals programmed may be detected by a tone decoder means in the printing/programming system 300 placed in proximity to the transducer 18 and sound output ports 14 in the dialer device 11. DTMF signals generated by the dialer device 11 can be compared against the intended programming signals as is well known in the art. This may be done nearly simultaneous with the programming operation to maximize total throughput of the programming process. Upon detection of an error condition, the device programming section 304 can retry a programming sequence by default or alert an operator of the potential defective device or faulty programming connection for corrective action.

Once the device programming section 304 has successfully completed the programming sequence, the dialer device 11 is automatically transferred from the device programming section 304 to the device printing section 306. Detection of error conditions, management of data transfer, dialer device handling and other functions within the improved printing/programming method can be accomplished with a variety of process control microprocessors and apparatus well known to those skilled in the art and not discussed in detail here.

When the dialer device 11 has been properly received at the device printing section 306, the data input/output section 303 retrieves the print data from the data storage means 301 or buffer memory in the device programming section 304 and transfers the print data to the device printing section 306 via connection 310 or alternative connection 305. Alternatively the device printing section 306 could incorporate a DTMF decoder and the dialer device could be caused to generate the dial signals previously programmed in the device programming section 304. Upon detection of DTMF signals by the decoder, machine readable instructions could be generated and affect corresponding printing data to be applied to the dialer device. In the preferred embodiment the device printing section 306 uses a high resolution ink jet printhead using ink that is compatible with Lexan or other label material. There are various inks that have superior adhesive and wear properties that are well suited for this purpose and are well known in the art.

The data received at the device printing section 306 is used to print the label surface of the dialer with variable print information 24 that corresponds to the previously programmed information in dialer device 11. Various printing techniques can be used, including a clear adhesive overlay material applied to the outer surface of the label/switch surface, laserjet printing, and other methods.

Alternatively, barcode or optical character recognition techniques well known to those skilled in the art could be used.

Figure 4:
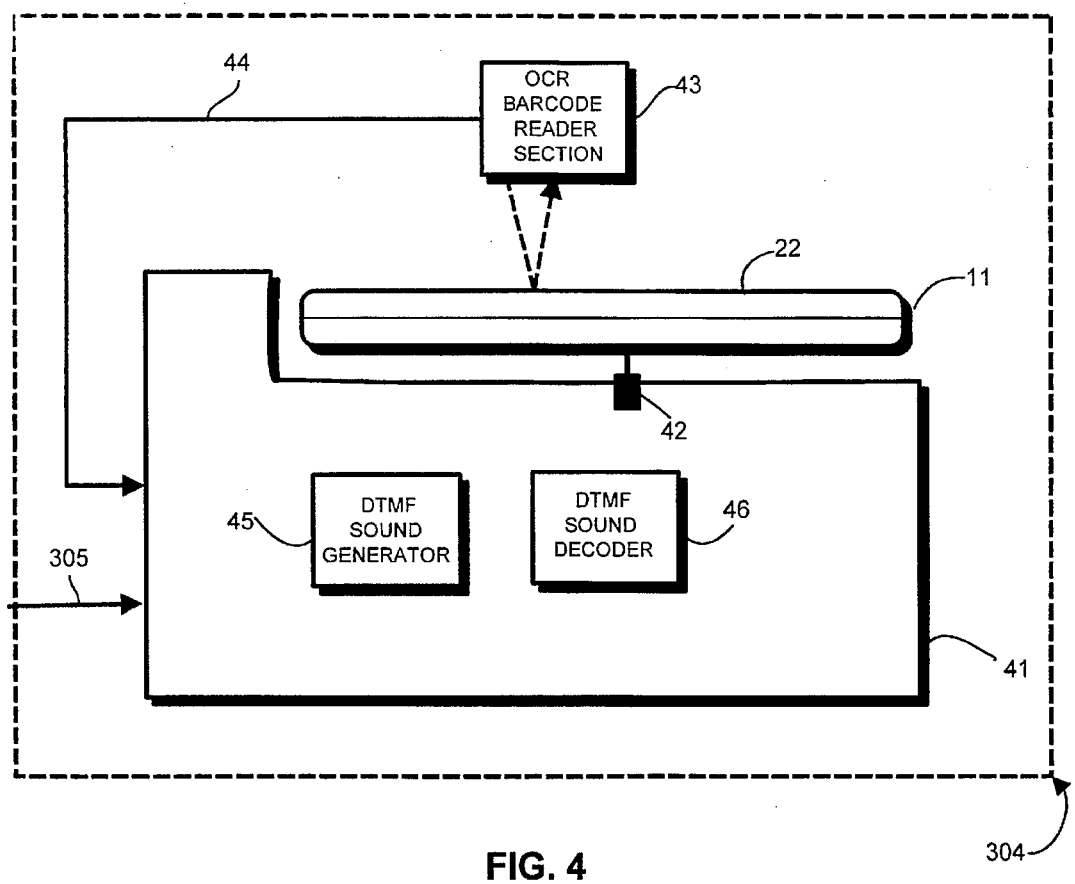
FIG. 4 shows a programmer-to-dialer interface using optical character or barcode recognition.

In FIG. 4 is shown a method employing such a system wherein variable information can be printed on the dialer in the form of textual or barcode data. The printing/programming apparatus can be adapted to include an OCR or barcode reading section 43 that retrieves printed image information from the switch/label surface 22 and converts the information detected into data for programming instructions. After the programming fixture 41 receives a dialer device 11 for programming, the OCR/Barcode reader section 43 reads any printed data on dialer device 11 and transfers programming data instructions to programming interface 42 via connection 44. A control means (not shown) then causes programming instructions to be executed and dialer device 11 receives programming data from programming section 304 and programming interface 42.

Programming interface 42 could be a releasable electrical connection as shown or could be an optical, acoustic or other wireless method as previously discussed. For example, the device programming section 304 could include a DTMF or other sound generator 45 that was connected to a transducer or other sound signal output means. Utilizing an acoustic interface in place of the releasable electrical interface 42 shown, DTMF or other sound data could be transmitted to a dialer device 11 that contained the appropriate sound recording and replay circuitry and was adapted to receive acoustic programming signals from programming section 304. The dialer unit 11 could incorporate an integrated sound input means such as a Piezo transducer and the case housing 12 could allow acoustic sound signals to be received from the device programming section 304 when the dialer unit 11 was aligned with the acoustic programming interface 42.

Alternatively in FIGS. 1a–1d show an integrated circuit 26 housed within the dialer device 11 that includes a DTMF generator adapted to receive acoustic programming instructions from a connected sound input means. For example, a particular sound frequency such as 800 Hz may represent the programming instruction corresponding to the DTMF digit "1", a 850 Hz signal may represent the programming instruction corresponding to the DTMF digit "2", and so on. Each subsequent acoustic programming signal detected by the dialer device 11 causes a programming instruction to be stored in the integrated circuit 26 for later redial. After the programming sequence is completed a user of the device may then initiate a dial sequence in the conventional manner by depression of raised conductive switch contact 25 and the stored programming instructions are retrieved. A DTMF generator then outputs the corresponding dial signals.

Alternatively the programming instructions can be DTMF or other sound signals that are received acoustically and stored in a digital record/playback means within the dialer device. These DTMF or other sound signals may be generated from an integral DTMF or sound signal generator 45 contained within the device programming section 304 shown in FIG. 4 or as presented in the variable programming data supplied to the device programming section 304 from data storage means 301, data input/output section 303 and data connection 305 as shown in FIG. 3. This method could be particularly useful in that the dialer device would not require an integral DTMF generator to create a dialing signal. In such a case however, the device printing section 306 could be modified to incorporate a DTMF decoder to translate the audible data signals in the dialer device into numeric machine readable data for the generation of printing instructions. Alternatively, additional machine readable printing instructions that were out of band or Separately delivered along with audible sound data could accompany the DTMF or sound programming instructions retrieved from data connection 305 or 310.

In addition, the received and stored audible DTMF or sound signals can be applied to a DTMF or sound decoder and character generator within the dialer device 11 to display the audible DTMF sounds received on a display member prior to, during or after initiation of a dial sequence from the dialer device.

A similar approach to that hereinbefore described could be modified in which optical or infrared light signals generated from the device programming section 304 could be received in a sensor within the dialer device 11 adapted to accept light impulses arranged in a predetermined logical sequence. Such light impulses could be received by a light signal detector within the dialer device 11 rather than the previously mentioned sound input means. A similar programming interface is commonly used in infrared communication systems such as seen in Personal Digital Assistants or in a newly introduced watch product manufactured by Timex called the "data link" incorporated by reference that utilizes barcode-like light signals flashed on a CRT screen display to transmit data to a sensor contained in the watch. Similar visible light or infrared signals could be presented from the device programming section 304 and programming interface to a light input port within the dialer unit to cause programming data to be transmitted in a wireless method.

The programming data instructions received from data connection 305 at device programming section 304 could be audible DTMF, sound or other logical data signals supplied to the DTMF/sound generator 45, DTMF sound decoder 46 or programming interface 42. In the case where dialer device 11 incorporates a DTMF signal generator such as the SGS MK53732, a simple row and column connection as is well known in the art could be employed in response to signals received from the data connection 305 or 44 to cause programming via the programming interface 42.

After the conclusion of the programming and printing of the dialer device 11 by the device programming section 304 and device printing section 306, the device output handling section 307 transfers the dialer device 11 to shipping and fulfillment in 309. Optionally a shipping and packing receipt in 308 can be generated manually or by using data from data input/output section 303 and data storage means 301.

FIGS. 2c–2f address various embodiments of the improved programming/printing apparatus and method and are self explanatory. For purposes of brevity they are not discussed in detail but are intended to teach various modifications that could be employed without departing from the spirit of this invention.

Directed again to FIGS. 1a–1d and to FIGS. 2a and FIGS. 2c–2f it should be recognized that the particular mechanical configuration of the dialer device is subject to various modifications without departing from the spirit of the invention. For example, in U.S. Pat. No. 4,941,172 issued to Winebaum is taught a dialer device in which a single microchip is preprogrammed with a train of dialing signals along with a speaker, a battery, and a switch for actuation, all of which are mounted on a substrate constructed of relatively stiff but flexible paper, paperboard, plastic or other suitable material. The processes of printing in publications as described in Winebaum may differ from the preferred embodiment described herein. However the novel application of combined printing and programming from a single data source as taught in this specification could be readily adapted to the Winebaum system utilizing printing and process control methods customary to the printing industry. As one example, when a dialer device is used as an advertising vehicle in mass-distribution media products, it may be desirable to incorporate distinctly different programmed and printed dialer data in a tear-out or insert along with dialer data corresponding to a centralized automated telemarketing system. Upon using the promotional card, the user would first dial in to the centralized system using a non-variable ROM memory and then could use a second variable preprogrammed and imprinted memory to represent some random number. This random variable number could be used to generate a dialing sequence for a promotional sweepstakes or the like in which a matching number determined at the centralized system would constitute a winning entry. Various other applications for the improved system and dialer device described herein are contemplated though not described in detail.

As another example, a dialer device that was programmable in an acoustic manner could be easily programmed by the end-user by utilizing their own touchtone telephone as a programming device. In this case it may not be necessary or desirable for the end-user to affix any corresponding printed indicia representative of the number(s) acoustically preprogrammed by them. Such an application would be particularly useful in the personalized greeting card industry or other retail applications.

Figure 5:
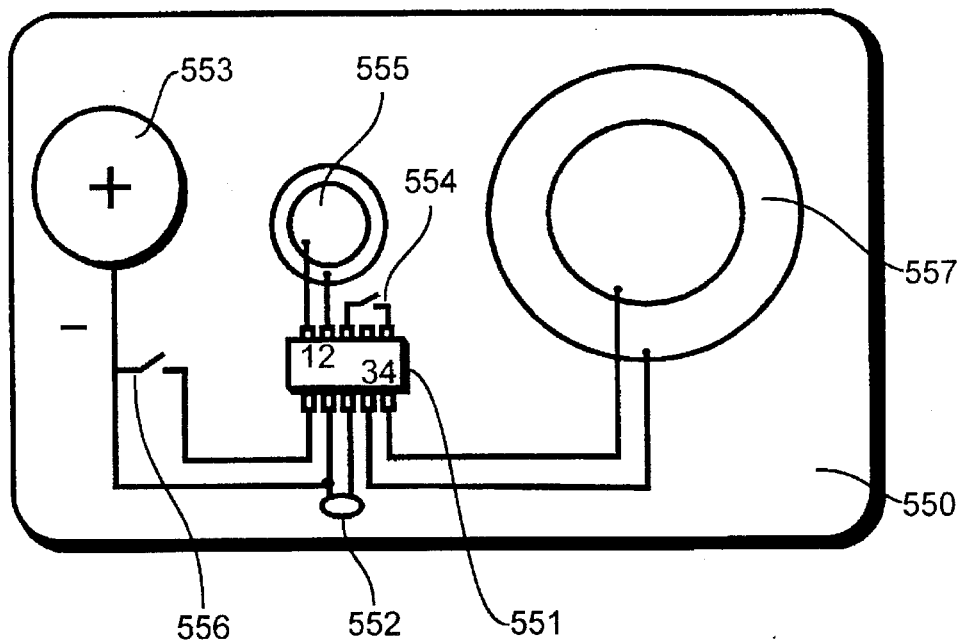
FIG. 5 is a schematic drawing showing elements arranged on a base card in an acoustically programmable dialer device with a digital sound record/playback circuit.

FIGS. 5 and 6 show a dialer device adapted to receive sound input rather than the releasably electrical row and column or serial input of programming instructions. Audible DTMF tones or other sound data may be stored in such a circuit whereas the conventional dialer is limited to only DTMF programming and generation. There are several commercially available chipsets adapted to store sound signals such as the Radio Shack part number 276-1324, part number 276-1325 or a commonly available greeting card product available from Hallmark Cards that records and replays sound signals.

Initial prototypes were constructed using the Hallmark sound recording device in which a piezo type sound input means integral to the device was held in acoustical alignment with the ear piece of a standard touch tone telephone. The Hallmark device was then placed in a "record" mode and a dial signal was generated at the telephone by depressing the DTMF keypad and generating the desired DTMF tone sequence. The DTMF sounds were generated through the earpiece of the telephone handset and recorded in the Hallmark device. After the dialing signal sequence was completed, the "record" mode was ended in the Hallmark device. Then the Hallmark device was placed in a "Play" mode and held in acoustic proximity to the mouthpiece of an off-hook touchtone telephone that was connected to the telephone line. The DTMF sounds that were previously recorded were regenerated from a transducer in the Hallmark device, dial tone was broken and the telephone number was successfully dialled through the telephone network.

Such a unique programming interface is not specifically limited to non-display type acoustic dialing apparatus. For example, other personal communication devices such as stored voice paging receivers, cellular telephones with message storage, and other communication systems that incorporate dialing signal generators could be adapted to employ audible DTMF programming techniques.

Referring again to FIGS. 5 and 6, a card or printed circuit board suitable for mounting components is shown in 550. 551 is a digital record/playback type integrated circuit which is connected to discrete components 552 necessary for circuit operation such as a capacitor for memory retention. Also shown is a power supply 553, a programming selection switch 554, a sound input means 555, a playback switch 886, and a sound output transducer 557. Power supply in the preferred embodiment typically ranges from 4.5–6 volts.

A releasable electrical connection may be used with a non-integral sound input means (not shown), or an integrated sound input means 555 can be employed to receive DTMF or other sound data for storage in integrated circuit 551. When programming selection switch 554 is in a closed position, integrated circuit 551 is made ready to receive sound data from sound input means 555. Alternatively in a dialer device with a non-integral sound input means, integrated circuit 551 can automatically switch to a sound input programming mode upon detection of connection with a sound input means 555 on pins one and two of the integrated circuit 551. This eliminates the need for programming selection switch 554 in this case.

In another embodiment, the sound input means can be activated by closure of programming selection switch 554 in which sound input means 555 may be eliminated. In this approach, sound output transducer 557 may also serve as a sound input means. In this case, upon detection of a closed condition of programming selection switch 554, integrated circuit 551 can receive data input from sound transducer 557 via pins three and four to be stored in integrated circuit 551. Programming data from an outside source such as acoustic DTMF sounds are applied to the sound transducer 557 via sound input port 658 in case housing 661 which detects the sound pressure level differences and transmits the sounds detected during a programming mode to a memory in integrated circuit 551. This novel approach eliminates the need for any additional sound input means as shown in FIG. 5 because the sound transducer 557 receives and generates sound signals, depending upon the position of programming selection switch 554.

In any case, when programming selection switch 554 is in an open condition, integrated circuit 551 ends the programming mode and replays the stored sound data by sound output transducer 557 via sound output port 659 in case housing 661 upon depression of playback switch 556. Acoustic coupler 660 is provided for difficult or noisy dialing environments.

Other non-DTMF sound data such as a prompt with verbal instructions, annunciated voice signals representative of dialing instructions or advertising announcements can also be recorded as shown in FIGS. 5 and 6 to provide a more functional dialer device. Alternatively, non-DTMF sound data may be hardwired on a mask level in the integrated circuit 551.

Such non-DTMF sound data may be heard by the end-user of the device from the sound transducer 557 directly, amplified through the earpiece when the dialer device is held to the mouthpiece of a telephone, or heard by a remote party or system that is connected with the end user by a telephone connection.

Other signal generation means such as electromagnetic signals or light impulses representative of an access number or account/authorization codes can be generated by the dialer device 11 instead of conventional DTMF or sound signals in communication systems adapted to receive such signals as dialing instructions. For sake of brevity, such devices are not described in detail in this application but it is understood that such dialer devices preprogrammed with data could also benefit from the invention taught herein. Referring again to FIG. 6, an alternative embodiment is shown in which an acoustic dialer card includes a magnetic stripe 662 that may be encoded with calling card data as an alternative to acoustic dialing in the case where telephone equipment is blocked or otherwise unable to receive acoustic signals from the dialer device described herein. The encoding process can be integrated with the previously described integrated dialer programming and imprinting operations to provide a more functional and highly useful dialer card device.

While the invention has been described in only one of its forms, it should be apparent to those skilled in the art that it is not so limited, but is susceptible to various changes and modifications not discussed herein without departing from the spirit thereof.

What is claimed is:

1. An autodialer and printing/programming system, comprising:
   an autodialer, including:
   (a) a housing, including at least one planar surface;
   (b) a DTM F generation circuit located within said housing;
   (c) an audio output device coupled to said DTMF generation circuit for receiving signals therefrom and generating audible dial tones;
   (d) operator-actuable means for initiating the successive generation of:
      (1) a uniform DTMF access number, and
      (2) a unique DTMF account number; and
   a combination printing/programming system, including:
   (a) means for programming said autodialer with said uniform DTMF access number;
   (b) means for imprinting said at least one planar surface of said autodialer with at least variable data; and
   (c) means for automatically confirming accurate programming of at least said unique DTMF account number.

2. An autodialer, according to claim 1, wherein said operator actuable means for initiating comprises:
   a single activation switch which initiates an automatic and successive generation by said DTMF generation circuit of (1) a uniform DTMF access number, and (2) a unique DTMF account number.

3. An autodialer, according to claim 1, wherein said operator actuable means for initiating comprises:
   a first switch member dedicated to the generation of said uniform DTMF access number; and
   a second switch member dedicated to the generation of said unique DTMF account number.

4. An autodialer, according to claim 1, wherein said operator actuable means for initiating includes at least one pressure sensitive, elevated dome switch.

5. An autodialer, according to claim 4, wherein said operator actuable means for initiating further includes human readable information for selecting said at least one pressure sensitive, elevated dome switch to at least one of said uniform DTMF access number and said unique DTMF account number.

6. An autodialer, according to claim 1, where in said non-electrical signal comprises an acoustic signal.

7. An improved autodialer, according to claim 1, wherein said programming member may be utilized during a programming mode of operation to receive and record at least one of:

(1) a sequence of digits which define said uniform DTMF access number, (2) a sequence of digits which define said unique DTMF account number.

8. An autodialer, according to claim 1, wherein said programming member is responsive to DTMF dial tones generated by a telephone.

9. An improved autodialer, according to claim 1, further including:

means for switching said audio output device between:
  (a) a transmitter mode of operation wherein said audio output device generates DTMF signals in response to commands received from said DTMF generation circuit; and
  (b) a receiver mode of operation wherein said audio output device cooperates with said programming member for receiving said non-electrical signal and supplying a corresponding electrical signal to said programming member.

10. A method of manufacturing an autodialer comprising the method steps of:

(a) providing a plurality of dialer device housings;

(b) providing a plurality of DTMF generation circuits, each which include at least:

(1) an access number memory, and (2) an account number memory;

(c) programming said plurality of DTMF generation circuits with a uniform access number, by loading said uniform access number in each of said access number memory;

(d) imprinting non-variable data onto at least a portion of said plurality of dialer device housings;

(e) programming said plurality of DTMF generation circuits with a unique account number, by loading said unique account number in each of said account number memory; and (f) simultaneously with step (e), imprinting variable data onto at least a portion of said plurality of dialer device housings.

11. A method of manufacturing an autodialer, according to claim 1, further including:

providing a reader member for reading said variable data and determining a unique account number associated therewith;

providing a programming member for receiving said variable data from said reader member; and utilizing said programming member to program said plurality of DTMF generation circuits with a unique account number.

* * * * *